(No Model.)
H. G. TROXELL.
NUT LOCK.
No. 549,550. Patented Nov. 12, 1895.
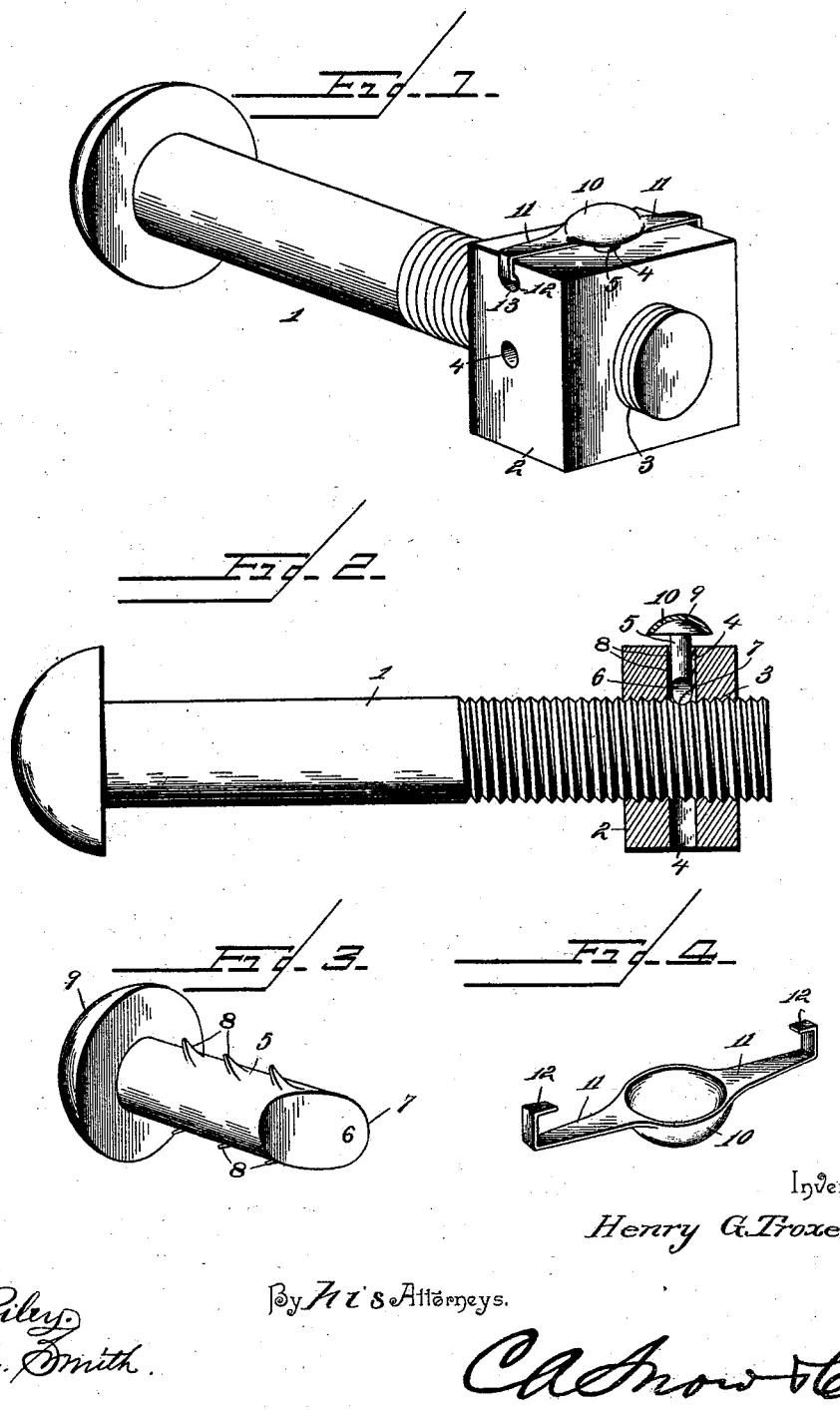
Witnesses
T. W. Riley
R. M. Smith
By His Attorneys.
C. A. Snow & Co.
Inventor
Henry G. Troxell.

UNITED STATES PATENT OFFICE.

HENRY G. TROXELL, OF WILLIAMSPORT, PENNSYLVANIA.

NUT-LOCK.

SPECIFICATION forming part of Letters Patent No. 549,550, dated November 12, 1895.

Application filed April 11, 1895. Serial No. 545,327. (No model.)

*To all whom it may concern:*

Be it known that I, HENRY G. TROXELL, a citizen of the United States, residing at Williamsport, in the county of Lycoming and State of Pennsylvania, have invented a new and useful Nut-Lock, of which the following is a specification.

This invention relates to an improvement in nut-locks, and has for its object to provide simple and efficient means adapted to be used in connection with any ordinary bolt and nut for the purpose of preventing the escape of the nut from the bolt.

To this end the invention consists in a nut-lock device, comprising a pin beveled or chamfered off at its inner operative end, and also provided with a series of barbs or prongs arranged along its shank, said pin being adapted to be engaged within a perforation in the nut and to engage the shank of the bolt for preventing said nut from turning relatively to the bolt.

It also consists in certain novel features and details of construction, as hereinafter fully described, illustrated in the drawings, and pointed out in the claim.

In the accompanying drawings, Figure 1 is a perspective view of an ordinary bolt and nut having my improved lock applied thereto. Fig. 2 is a sectional view taken through the nut in line with the perforation therein for the reception of the locking-pin, the bolt being shown in elevation and the locking-pin being also shown in elevation and in engagement with the nut and the shank of the bolt. Fig. 3 is a detail perspective view of the locking-pin. Fig. 4 is a similar view of the safety-cap.

Similar numerals of reference indicate corresponding parts in the several figures of the drawings.

Referring to the accompanying drawings, 1 designates a bolt of any ordinary construction, and 2 a nut of any usual form engaging said bolt.

The nut 2 is provided with the usual central threaded perforation 3 for the reception of the threaded shank of the bolt, and is further provided upon one or more sides with perforattons 4, arranged at right angles to the threaded perforation 3 and leading from the exterior of the nut into said threaded perforation, as shown.

5 designates a pin, the shank of which is of a size and shape adapting it to be inserted into one of the perforations 4 of the nut. The shank of the pin may be either round or polygonal in cross-section to correspond with the perforation in the nut into which it is inserted. The inner end of the nut is beveled or chamfered off, as indicated at 6, thereby forming a sharp point or edge 7, which is adapted to penetrate or be forced into the shank of the bolt for preventing relative movement between the bolt and nut. The shank of the pin 5 is further provided with a series of laterally-projecting rearwardly-inclined barbs 8, formed integrally therewith and adapted when said pin is forced into engagement with the bolt to engage the interior wall of the perforation 4 in which said bolt is inserted, thereby effectually preventing the pin from being withdrawn or accidentally displaced. The pin may also be provided with a head 9, adapted when the pin is in place and in engagement with the bolt to rest outside of the face of the nut, as shown in Fig. 2.

10 designates a safety-cap, which comprises oppositely-extending arms 11, which are extended the length of one side of the nut, the ends of said arms being bent at right angles, as indicated in Figs. 1 and 4, to embrace the adjacent sides of the nut, after which the extremities of said arms are hooked inwardly, as shown at 12, said hooked ends being adapted to enter and engage sockets 13 in opposite sides of the nut. The central portion of the safety-cap is enlarged and hollowed out in its under face, whereby said cap is adapted to embrace the head 9 of the locking-pin 5 for preventing the escape of said pin in the event of the barbs thereof becoming stripped from the shank of the pin.

By the construction above described a simple and efficient form of nut-lock is obtained, which is applicable to any ordinary form of bolt and nut in common use by simply drilling the perforations in the nut for the reception of the locking-pin. The safety-cap above described is auxiliary to the locking-pin and may be dispensed with, if desired. By means of the particular form of locking-pin described a nut may be locked upon a bolt in the shortest possible space of time, all that is necessary being to insert the end of the locking-pin into the perforation in the nut and strike said pin a sharp blow with a hammer or sledge, when said pin will engage and penetrate slightly the shank of the bolt and at the same time be engaged by means of its barbs within the perforation in the nut.

Having thus described the invention, what is claimed as new, and desired to be secured by Letters Patent, is—

A nut lock device, comprising a locking pin beveled or chamfered off at its inner end for adapting it to indent or penetrate and engage the shank of a bolt, and provided with one or more barbs projecting from the shank thereof, said locking pin being adapted to be inserted through a perforation in a nut and to engage the shank of the bolt therein and to be held within said perforation by the engagement between the barbs of said pin and the inner wall of said perforation, substantially in the manner and for the purpose specified.

In testimony that I claim the foregoing as my own I have hereto affixed my signature in the presence of two witnesses.

HENRY G. TROXELL.

Witnesses:
JOHN H. SIGGERS,
HAROLD H. SIMMS.